United States Patent
Li et al.

(10) Patent No.: US 11,721,986 B2
(45) Date of Patent: Aug. 8, 2023

(54) BATTERY PACK CHARGING AND DISCHARGING PROTECTION SYSTEM

(71) Applicant: Globe (Jiangsu) Co., Ltd, Jiangsu (CN)

(72) Inventors: Baoan Li, Jiangsu (CN); Yanliang Zhu, Jiangsu (CN); Xian Zhuang, Jiangsu (CN); Huage Wang, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 379 days.

(21) Appl. No.: 17/098,322

(22) Filed: Nov. 13, 2020

(65) Prior Publication Data

US 2021/0152007 A1 May 20, 2021

(30) Foreign Application Priority Data

Nov. 15, 2019 (CN) .......................... 201911119542.X

(51) Int. Cl.
*H02J 7/00* (2006.01)

(52) U.S. Cl.
CPC ........ *H02J 7/00306* (2020.01); *H02J 7/0031* (2013.01)

(58) Field of Classification Search
CPC .... H02J 7/00306; H02J 7/0031; H02J 7/0036; H02J 2207/10; H02J 7/0068
USPC ....................................................... 320/134
See application file for complete search history.

(56) References Cited

U.S. PATENT DOCUMENTS

| | | | | |
|---|---|---|---|---|
| 6,208,117 B1* | 3/2001 | Hibi | ...................... | H02J 7/0014 320/136 |
| 7,116,140 B2* | 10/2006 | Koch | .................... | G06F 1/3203 327/143 |
| 8,797,171 B2* | 8/2014 | Yasuda | .................. | H02J 7/0071 340/636.12 |
| 8,890,482 B2* | 11/2014 | Ikeuchi | ................. | H02J 7/0031 320/135 |

(Continued)

FOREIGN PATENT DOCUMENTS

| CN | 207896684 U | 9/2018 |
|---|---|---|
| CN | 109120037 A | 1/2019 |

(Continued)

OTHER PUBLICATIONS

Extended Search Report of Counterpart European Patent Application No. 20207832.5 dated Mar. 25, 2021.

*Primary Examiner* — M Baye Diao

(57) ABSTRACT

A battery pack charging and discharging protection system comprises a battery pack and a power input controlling circuit connected with the battery pack. The system has a voltage regulator unit and a charging and discharging protection unit. The protection unit includes a coupling wake-up circuit, a power-off acceleration circuit, an MCU self-locking circuit and a button detection circuit. The coupling wake-up circuit is connected with the power input controlling circuit. The power-off acceleration circuit is connected with the coupling wake-up circuit. Compared to the conventional technology, the present invention adopts single-wire compatible communication and coupled wake-up mode to achieve the autonomous power-off of the battery pack in time, avoiding over-discharge of the battery caused by the long-term self-consumption of the battery pack.

10 Claims, 3 Drawing Sheets

(56) References Cited

U.S. PATENT DOCUMENTS

| | | | | |
|---|---|---|---|---|
| 9,843,205 | B2* | 12/2017 | Kimura | H02J 7/0031 |
| 2011/0133571 | A1* | 6/2011 | Kiyohara | H02J 7/0029 |
| | | | | 307/130 |
| 2014/0312913 | A1 | 10/2014 | Kikuchi et al. | |
| 2016/0006278 | A1 | 1/2016 | Sakakibara | |
| 2019/0245371 | A1* | 8/2019 | Qiu | H02J 7/0018 |

FOREIGN PATENT DOCUMENTS

| | | | | |
|---|---|---|---|---|
| CN | 109683054 | A | 4/2019 | |
| CN | 209149116 | U | 7/2019 | |
| DE | 102018107474 | B4* | 5/2022 | H02M 1/08 |
| KR | 20180087014 | A* | 8/2018 | H02J 7/0031 |

* cited by examiner

BATTERY PACK CHARGING AND DISCHARGING PROTECTION SYSTEM

CROSS-REFERENCE TO RELATED INVENTIONS

This invention is a US application which claims the priority of CN application Ser. No. 201911119542.X, filed on Nov. 15, 2019, the disclosures of which are hereby incorporated by reference in their entirety.

TECHNICAL FIELD

The invention relates to a battery pack, in particular to a charging and discharging protection system of a battery pack.

BACKGROUND ART

With the development and popularization of new energy technologies, more and more products are powered by battery packs. In order to extend the service life of the battery pack, it needs to optimize the system power supply of the battery pack. Traditional battery packs mostly use direct-connected single-wire communication to match chargers and tools. Direct single-wire communication has the following disadvantages: firstly, the charger wakes up and communicates with the battery pack through the single-wire communication port, and as long as the wake-up signal exists, the battery pack cannot be shut down and powered off autonomously, supposing that a battery pack has been discharged and needs to be charged, and the charger cannot be provide charging current due to a fault, at this time, the battery pack has been awakened in a self-consumption state, and cannot be shut down autonomously, which will result in that the battery pack will be discharged for a long time until depleted; secondly, when the battery pack is discharging during matching a tool, if the tool fails and the wake-up signal cannot be turned off, the battery pack remains in working mode, which will cause the battery to over discharge for a long time.

In view of the above, there is a need to improve the output mode of the battery pack to solve the above problems.

SUMMARY OF INVENTION

The objective of the present invention is to provide a battery pack charging and discharging protection system, which adopts single-wire compatible communication and coupled wake-up mode to achieve the autonomous power-off of the battery pack in time to avoiding over-discharge of the battery caused by the long-term self-consumption of the battery pack.

To achieve the above object, the present invention provides a battery pack charging and discharging protection system comprising a battery pack and a power input controlling circuit connected with the battery pack, a voltage regulator unit connected to the power input controlling circuit, a charging and discharging protection unit, the charging and discharging protection unit comprising a coupling wake-up circuit connected with the power input controlling circuit and configured to drive the voltage regulator unit to complete the power-on of the MCU self-locking circuit, a MCU self-locking circuit configured to autonomous power-off the MCU self-locking circuit, a power-off acceleration circuit connected with the coupling wake-up circuit and configured to detect the voltage of the voltage regulator unit to control a close of wake-up signals of the coupling wake-up circuit; and a button detection circuit.

As a further improvement of the invention, the power input controlling circuit comprises a first switch unit and a second switch unit, and the power-off acceleration circuit comprises a first acceleration module and a second acceleration module arranged in parallel, and wherein the first acceleration module has one end thereof connected to the voltage regulator unit and the other end connected to the MCU self-locking circuit to completely turn off the first switch unit and complete the power-off of the battery pack.

As a further improvement of the invention, the first acceleration module comprises a first MOS switch QA3, an RC parallel circuit connected to the first MOS switch QA3 and an acceleration resistor.

As a further improvement of the invention, the acceleration resistor has one end thereof connected to the drain of the first MOS switch and the other end connected to the MCU self-locking circuit, so as to realize the rapid discharge of the first switch unit.

As a further improvement of the invention, the RC parallel circuit has one end thereof connected to the gate of the first MOS switch and the other end connected to the source of the first MOS switch, so as to remain the first MOS switch in a turn-on state when the output voltage of the voltage regulator unit is lower than the driving voltage and completely turn off the first switch unit to complete the power-off of the battery pack.

As a further improvement of the invention, the second acceleration module has one end thereof connected with the voltage regulator unit and the other end connected with the MCU self-locking circuit, so as to turn off the discharge loop of the first switch unit when the battery pack is normally powered on.

As a further improvement of the invention, the MCU self-locking circuit comprises an MCU microcontroller, a Power EN power enable terminal connected to the MCU microcontroller, and a resistor and a capacitor connected to the Power EN power enable terminal, and wherein the MCU microcontroller is used to detect an operation state of the battery pack and the charger and/or the electricity system connected with the battery pack and to realize the autonomous power-off of the battery pack.

As a further improvement of the invention, the coupling wake-up circuit is connected between the power input controlling circuit and the MCU self-locking circuit, and comprises a switch coupling wake-up circuit for manually waking up the battery pack, a single-wire communication coupling circuit for waking up the battery pack during the charging process.

As a further improvement of the invention, the switch coupling wake-up circuit comprises a first switch coupling wake-up circuit and a second switch coupling wake-up circuit that are turned on by a button, and wherein when the first switch coupling wake-up circuit and the second switch coupling wake-up circuit are turned on by the button, a positive pole of the battery pack is coupled to the first switch unit to turn on the first switch unit together with the second switch unit, and drives the voltage regulator unit to ensure a stable operation of the battery pack.

As a further improvement of the invention, the switch button detect circuit divides the voltage of the battery pack and transmits the divided voltage to the MCU self-locking circuit through the voltage regulator unit when the button between the first switch coupling wake-up circuit and the second switch coupling wake-up circuit is turned on, and the MCU self-locking circuit detects the duration time of the high level of the button to send a power-down instruction.

The beneficial effects of the present invention are: the battery pack charge and discharge protection system of the present invention adopts single-wire compatible communication and coupled wake-up mode to achieve the autonomous power-off of the battery pack in time, avoiding over-discharge of the battery caused by the long-term self-consumption of the battery pack. At the same time, it can detect the charger and/or the electricity system connected to the battery pack, and complete autonomous power-off when the charger and/or the electricity system are abnormal, which effectively improves the safety and the service life of the battery pack, and can be applied to high voltage output environment, and has the advantages of fast response speed and high reliability.

The above general description and the following detailed description are intended to be illustrative and not restrictive.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with present invention. On the contrary, they are only examples of devices, systems, machines and methods consistent with some aspects of the invention as detailed in the appended claims.

Figure 1:
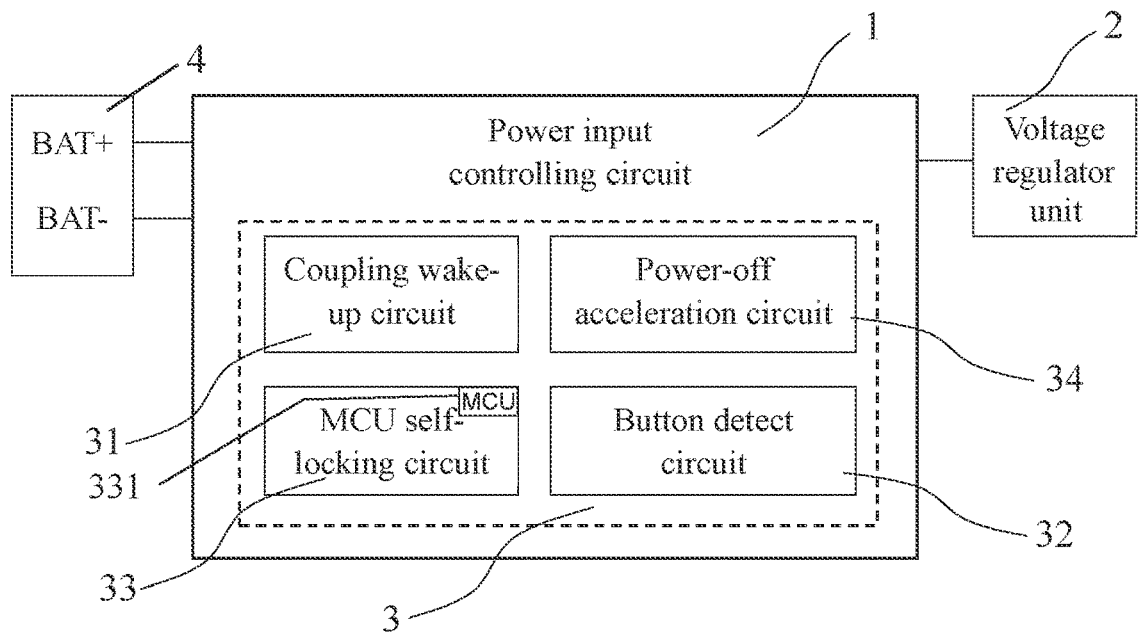
FIG. 1 is a structural diagram of a battery pack charging and discharging protection system in accordance with the present invention.
Figure 2:
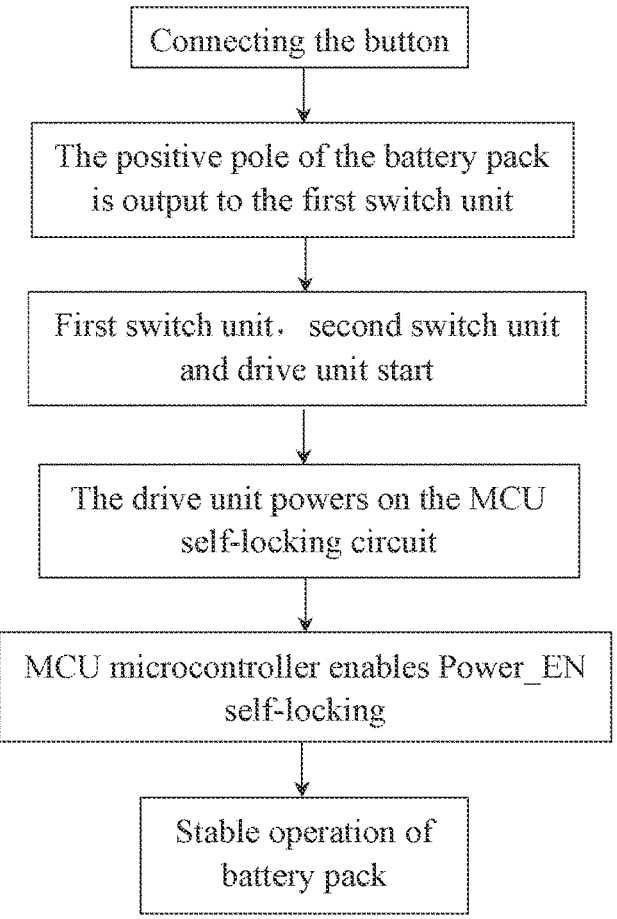
FIG. 2 is a schematic diagram of a switch coupling wake-up circuit of the present invention.
Figure 3:
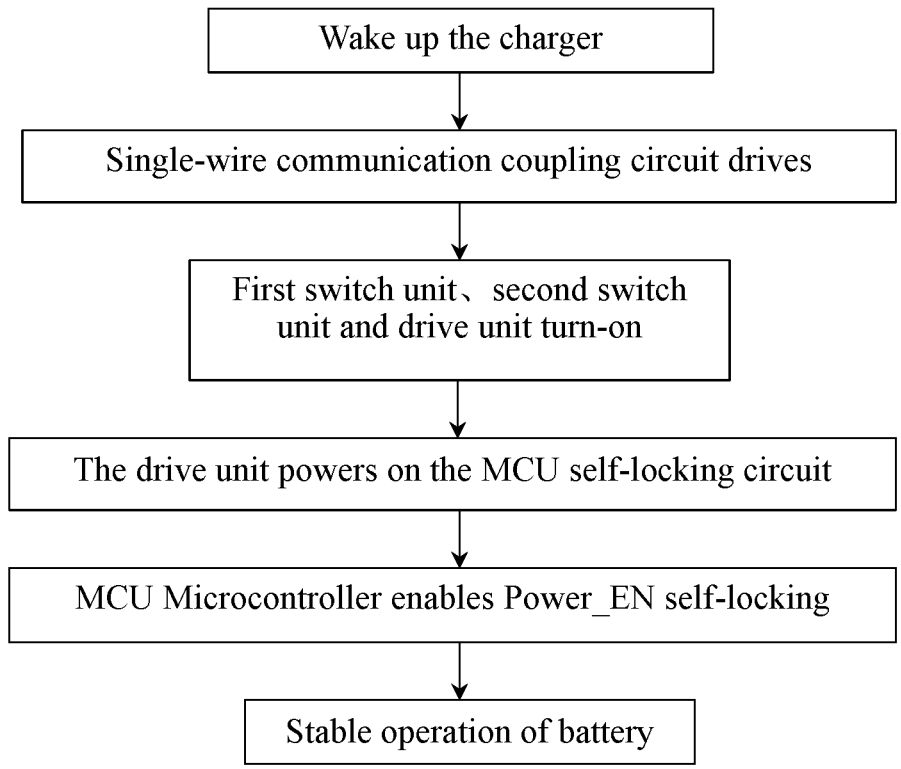
FIG. 3 is a schematic diagram of a single-wire communication coupling circuit of the present invention.
Figure 4:
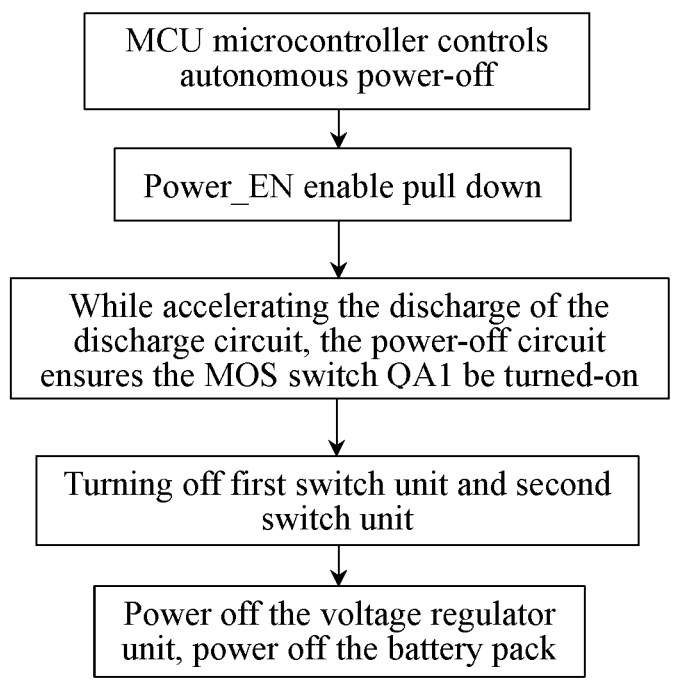
FIG. 4 is a schematic diagram of a MCU self-locking circuit of the present invention.
Figure 5:
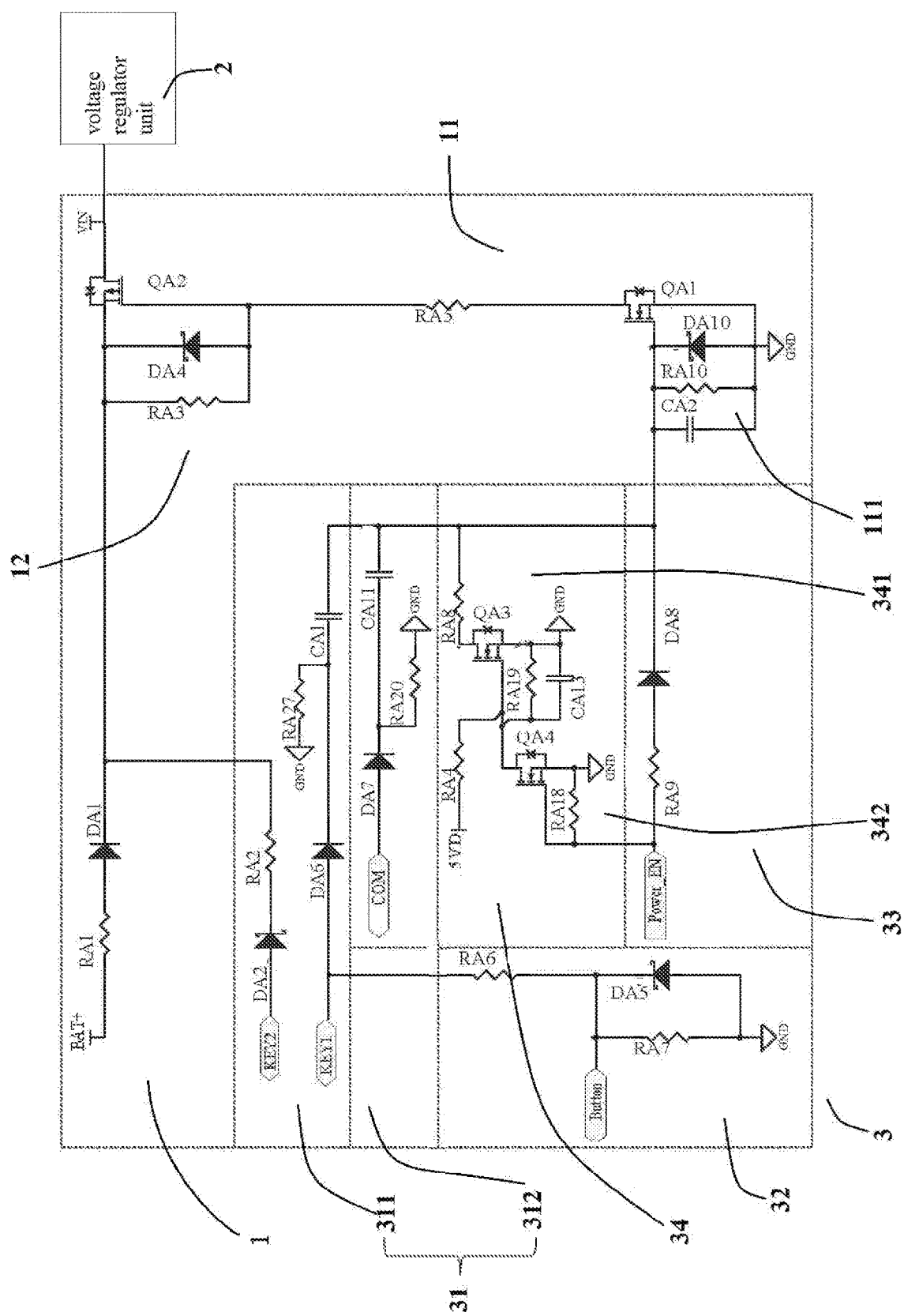
FIG. 5 is a circuit diagram of a battery pack charging and discharging protection system of the present invention.

Referring to FIG. 1, a battery pack charging and discharging protection system of the present invention is disclosed, which comprises a battery pack (not labeled) and power input controlling circuit 1 connected with the battery pack. The battery pack charging and discharging protection system also comprises a voltage regulator unit 2 connected within the power input controlling circuit 1 and a charging and discharging protection unit 3.

Referring to FIG. 2-FIG. 5, the power input controlling circuit 1 is connected to a positive electrode of the battery pack for connecting to a charger (not shown) and/or an electrical system (not shown). In the present invention, the power input controlling circuit 1 includes a first switch unit 11 and a second switch unit 12. The first switch unit 11 includes a MOS switch QA1 and a discharge circuit 111 arranged in parallel with the MOS switch QA1. Among them, the MOS switch QA1 is an N-channel MOS switch. One end of the discharge circuit 111 is connected to the gate of the MOS switch QA1, and the other end is connected to the source of the MOS switch QA1 to discharge the MOS switch QA1 and turn off the MOS switch QA1.

Preferably, the discharge circuit 111 is grounded and includes a diode DA10, a resistor RA10, and a capacitor CA2 arranged in parallel. As can be understood, in other embodiments of the present invention, the discharge circuit 111 can also have other forms of discharge structure, and it is only necessary to ensure that the discharge circuit 111 can complete the discharge of the MOS switch QA1.

The second switch unit 12 is connected in series with the first switch unit 11, which connects to the voltage input VIN of the power input controlling circuit 1, and controls the power input controlling circuit 1 to turn off. In the embodiment of the present invention, the second switch unit 12 includes a MOS switch QA2, a diode DA4 connected in parallel with the MOS switch QA2, and a resistor RA3. Specifically, the MOS switch QA2 is a P-channel MOS switch. One end of the diode DA4 and the resistor RA3 is connected to the source of the MOS switch QA2, and the other end is connected to the gate of the MOS switch QA2, and the drain of the MOS switch QA1 of the first switch unit 11 is also connected to the gate of the MOS switch QA2. Further, the drain of the MOS switch QA2 is connected to the voltage input VIN of the voltage regulation of the power input controlling circuit 1 before the voltage regulation, so that the second switch unit 12 ensures the normal use of the power input controlling circuit 1 while controls the shut-down of the power input controlling circuit 1 at the same time.

It should be noted that, in the embodiment of the present invention, for illustration purpose, the MOS switch QA1 is an N-channel MOS switch and the MOS switch QA2 is a P-channel MOS switch. In other embodiments of the present invention, the selection of the MOS switch QA1 and the MOS switch QA2 can be selected according to actual needs, which is not limited here.

The voltage regulator unit 2 is connected to a distal end of the voltage input VIN so as to ensure a stable voltage output when the power input controlling circuit 1 is connected to a system using power supply. In the present invention, the voltage regulator unit 2 is a Low Dropout Regulator (LDO). Preferably, the low dropout regulator is a 5V low dropout regulator to further ensure that the voltage output by the power input controlling circuit 1 is stable and meets the electricity requirements of the system.

The charging and discharging protection unit 3 is connected to the power input controlling circuit 1 and includes a coupling wake-up circuit 31, a button detection circuit 32, an MCU self-locking circuit 33 and a power-off acceleration circuit 34. The coupling wake-up circuit 31 is used to drive the voltage regulator unit 2, complete the power-on of the MCU self-locking circuit 33, and ensure the stable operation of the battery pack.

In the present invention, the coupling wake-up circuit 31 is connected between the power input controlling circuit 1 and the MCU self-locking circuit 33, and includes a switch coupling wake-up circuit 311 for manually waking up the battery pack and a single-wire communication coupling circuit 312 for waking up the battery pack during the charging process thereof.

Further, the switch coupling wake-up circuit 311 includes a first switch coupling wake-up circuit (not labeled) and a second switch coupling wake-up circuit (not labeled) that are controlled by a button. The first switch coupling wake-up circuit is connected to the input of the power input controlling circuit 1, the second switch coupling wake-up circuit is connected to the MCU self-locking circuit 33, and when the first switch coupling wake-up circuit and the second switch coupling wake-up circuit are turned on by the button, the positive pole of the battery pack is coupled to the gate of the MOS switch QA1 of the first switch unit 11 to turn on the first switch unit 11 and the second switch unit 12, and further drives the voltage regulator unit 2 to ensure stable operation of the battery pack, and at the same time enables the MCU self-locking circuit 33 to complete power-on initialization.

The single-wire communication coupling circuit 312 is connected to the second switch coupling wake-up circuit, and is connected to the MCU self-locking circuit 33 and the power-down acceleration circuit 34 through the second switch coupling wake-up circuit, and is further connected to the power input controlling circuit 1 for waking-up the battery pack when the battery pack is connected to an external power source for charging.

In a preferred embodiment of the present invention, the single-wire communication coupling circuit 312 includes a ground terminal, a resistor DA7, and a capacitor CA11. In such a way, when the battery pack is connected to the charger, the single-wire communication interface of the single-wire communication coupling circuit 312 can be pulled up by the internal voltage of the charger and coupled to the gate of the MOS switch QA1 through the capacitor CA11 to control the on/off of the MOS switch QA1 to further control the on/off of the second switch unit 12. The positive output of the battery pack passes through the second switch unit 12 and reaches the voltage input terminal VIN of the power input control circuit 1, and drives the voltage regulator unit 2 connected to the voltage input terminal VIN, so that the MCU self-locking circuit 33 completes a self-locking operation and ensures the stable operation of the battery pack.

It should be noted that the single-wire communication coupling circuit 312 of the present invention can also delay the wake-up of the battery pack. Specifically, when the battery pack is awakened by the single-wire communication coupling circuit 312, the MCU self-locking circuit 33 is firstly turned off, at this time, the single-wire communication interface of the single-wire communication coupling circuit 312 is pulled up by the internal voltage of the charger. The voltage in the single-wire communication coupling circuit 312 is greater than the maximum threshold voltage of the MOS switch QA1 and lasts for a certain period of time to control the MCU self-locking circuit 33 self-locking delay to ensure that there is enough time to wake up the battery pack and keep the battery pack working normally.

The MCU self-locking circuit 33 is used to detect the operating conditions of the battery pack and the charger and/or the electric system connected to the battery pack and realizes autonomous power-off of the battery pack. In the present invention, the MCU self-locking circuit 33 includes an MCU (microcontroller unit) 331, a power enable terminal (Power EN) connected to the MCU microcontroller, and a resistor RA9 and a diode DA8 connected to the Power EN.

Specifically, the voltage regulator unit 2 connects to the I/O interface (not shown) of the MCU microcontroller. When the button between the first switch coupling wake-up circuit and the second switch coupling wake-up circuit is turned on, the voltage regulator unit 2 regulates the output voltage to the I/O interface of the MCU microcontroller. At this time, the MCU microcontroller starts to calculate the high-level duration time when the button is turned on and determines whether the battery pack needs to be autonomously power-down according to the high-level duration time. Preferably, the regulated output voltage of the voltage regulator unit 2 is 5V. When the high-level duration time of the button>3 S, the MCU microcontroller executes an autonomous power-down instruction, and completes the power-down of the battery pack by pulling down the power enable terminal of the Power EN power supply. The autonomous control of power-down of the battery pack through the MCU self-locking circuit 33 is realized.

The power-down acceleration circuit 34 is used to detect the voltage value of the voltage regulator unit 2 and control the wake-up signal of the coupled wake-up circuit 2 to close, so as to ensure the realization of autonomous power-down of the MCU self-locking circuit 33. Specifically, when the autonomous power-off of the battery pack is controlled by the MCU self-locking circuit 33, the MCU microcontroller pulls down the power enable of Power EN. At this time, the capacitor CA2 of the discharge circuit 111 is discharged via the resistor RA10, so that the voltage of the MOS switch QA1 drops down to the threshold voltage. As the information of COM port in the single-wire communication coupling circuit 312 still exists, the MOS switch QA1 will be reopened and the battery pack will be re-powered, which will cause the autonomous power-off of the battery pack to be failed under the control of the MCU self-locking circuit 33. Therefore, the battery pack is always in a discharged state which causes the battery pack to be over-discharged. The arrangement of the power-off acceleration circuit 34 can ensure the correct realization of the autonomous power-off of the MCU self-locking circuit 33 when there is a signal on the COM port of the single-wire communication coupling circuit 312, so as to avoid the occurrence of over-discharge of the battery pack.

Specifically, the power-off acceleration circuit 34 includes a first acceleration module 341 and a second acceleration module 342 arranged in parallel. Among them, the first acceleration module 341 has one end thereof connected to the voltage regulator unit 2 and the other end connected to the MCU self-locking circuit 33, so as to completely turn off the first switch unit 11 and complete the power-off of the battery pack. Specifically, the first acceleration module 341 includes a first MOS switch QA3, an RC parallel circuit 343 connected to the first MOS switch QA3, and an acceleration resistor RA8.

In the present invention, the RC parallel circuit 343 has one end thereof connected to the gate of the first MOS switch QA3 and the other end connected to the source of the first MOS switch QA3, so as to remain the first MOS switch QA3 in a turn-on state when the output voltage of the voltage regulator unit 2 is lower than the driving voltage. And, the first switch unit 11 is completely turned off to complete the power-off of the battery pack.

The acceleration resistor RA8 has one end thereof connected to the drain of the first MOS switch QA3 and the other end connected to the MCU self-locking circuit 33, so as to realize the rapid discharging of the first switch unit 11. Specifically, when the MCU microcontroller detects a serious fault in the charger or the electric system, the MCU microcontroller executes an autonomous power-off command by pulling down the power enable terminal (Power EN) and controls the second acceleration module 342 to turn off and the first MOS switch QA3 to turn on. At this time, the capacitor CA2 of the first switch unit 11 is quickly discharged through the accelerating resistor RA8, and when the output voltage of the resistor RA19 and the capacitor CA13 of the RC parallel circuit 343 is lower than the driving voltage/not exists, it is ensured that the first MOS switch QA3 remains on for a period of time to ensure that the MOS switch QA1 is completely turned off and complete the power off of the battery pack. Preferably, in a preferred embodiment of the present invention, the driving voltage is 5V, the acceleration resistance RA8 is 1 KΩ, the resistance RA19 is 1 MΩ, and the capacitance CA13 is 1 uF.

The second acceleration module 342 has one end thereof connected to the voltage regulator unit 2 and the other end connected to the MCU self-locking circuit 33 to turn off the discharge loop 111 of the first switch unit 11 when the battery pack is normally powered on. In a preferred embodiment of the present invention, the second acceleration module 342 includes a second MOS switch QA4 and a resistor RA18 connected to the gate of the first MOS switch QA3. The second MOS switch QA4 can be used for turning off the RC parallel circuit 343 of the first MOS switch QA3 during a normal power-on operation of the system, so as to extend the shutdown time and ensure the normal power-off of the battery pack.

The battery pack charging and discharging protection system of the present invention is provided with a charging and discharging protection unit 3 including the coupling wake-up circuit 31, the button detection circuit 32, the MCU self-locking circuit 33, and the power-off acceleration circuit 34, which can quickly and effectively detects the faults of the battery pack and the charger and/or power system connected with the battery pack, and can also controls the autonomous power-off of the battery pack through the MCU self-locking circuit 33, so as to effectively solves the problem of the over-discharge of the battery pack caused by the battery pack cannot be powered off normally in the prior art; at the same time, the arrangement of the single-wire communication coupling circuit 312 enables the battery pack to be automatically awakened when the charger is connected on the one hand, and on the other hand, it can also extend the self-locking time of the MCU self-locking circuit 33 to ensure the normal power-on and power-off of the battery pack.

In summary, the battery pack charging and discharging protection system of the present invention adopts single-wire compatible communication and coupled wake-up mode to achieve the autonomous power-off of the battery pack in time, avoiding over-discharge of the battery caused by the long-term self-consumption of the battery pack. At the same time, it can detect the charger and/or the electricity system connected to the battery pack, and complete autonomous power-off when the charger and/or the electricity system are abnormal, which effectively improves the safety and the service life of the battery pack, and can be applied to high voltage output environment, and has the advantages of fast response speed and high reliability.

The above embodiment is only used to illustrate present invention and not to limits the technical solutions described in present invention. The understanding of this specification should be based on those skilled in the art, although present invention has been described in detail with reference to the above embodiment. However, those skilled in the art should understand that those skilled in the art can still modify or equivalently replace present invention, and all technical solutions and improvements that do not depart from the spirit and scope of present invention should be within the scope of the claims of the invention.

What is claimed is:

1. A battery pack charging and discharging protection system, comprising:
   a battery pack and a power input controlling circuit connected with the battery pack;
   a voltage regulator unit connected to the power input controlling circuit;
   a charging and discharging protection unit, the charging and discharging protection unit comprising:
   a MCU self-locking circuit configured to control the on/off of the battery pack, the MCU self-locking circuit comprising a MCU a microcontroller unit (MCU);
   a coupling wake-up circuit connected with the power input controlling circuit and configured to drive the voltage regulator unit to complete the power-on of the MCU self-locking circuit;
   a power-off acceleration circuit connected with the coupling wake-up circuit and configured to detect the voltage of the voltage regulator unit to control a close of wake-up signals of the coupling wake-up circuit;
   a switch button detect circuit connected with the MCU for detecting a signal actuated by an operator.

2. The battery pack charging and discharging protection system according to claim 1, wherein the power input controlling circuit comprises a first switch unit and a second switch unit, and the power-off acceleration circuit comprises a first acceleration module and a second acceleration module arranged in parallel, and wherein the first acceleration module has one end thereof connected to the voltage regulator unit and the other end connected to the MCU self-locking circuit to completely turn off the first switch unit and complete the power-off of the battery pack.

3. The battery pack charging and discharging protection system according to claim 2, wherein the first acceleration module comprises a first MOS switch, an RC parallel circuit connected to the first MOS switch and an acceleration resistor.

4. The battery pack charging and discharging protection system according to claim 3, wherein the acceleration resistor has one end thereof connected to the drain of the first MOS switch and the other end connected to the MCU self-locking circuit.

5. The battery pack charging and discharging protection system according to claim 3, wherein the RC parallel circuit has one end thereof connected to the gate of the first MOS switch and the other end connected to the source of the first MOS switch, so as to remain the first MOS switch in a turn-on state when the output voltage of the voltage regulator unit is lower than the driving voltage and completely turn off the first switch unit to complete the power-off of the battery pack.

6. The battery pack charging and discharging protection system according to claim 1, wherein the second acceleration module has one end thereof connected with the voltage regulator unit and the other end connected with the MCU self-locking circuit, so as to turn off the discharge loop of the first switch unit when the battery pack is normally powered on.

7. The battery pack charging and discharging protection system according to claim 1, wherein the MCU self-locking circuit comprises a power enable terminal connected to the MCU, and a resistor and a capacitor connected to the power enable terminal, and wherein the MCU is used to detect an operation state of the battery pack and the charger and/or the electricity system connected with the battery pack and to realize the autonomous power-off of the battery pack.

8. The battery pack charging and discharging protection system according to claim 1, wherein the coupling wake-up circuit is connected between the power input controlling circuit and the MCU self-locking circuit, and comprises a switch coupling wake-up circuit for manually waking up the battery pack, a single-wire communication coupling circuit for waking up the battery pack during the charging process.

9. The battery pack charging and discharging protection system according to claim 8, wherein the switch coupling wake-up circuit comprises a first switch coupling wake-up circuit and a second switch coupling wake-up circuit that are turned on by a button, and wherein when the first switch coupling wake-up circuit and the second switch coupling wake-up circuit are turned on by the button, a positive pole of the battery pack is coupled to the first switch unit to turn on the first switch unit together with the second switch unit, and drives the voltage regulator unit to ensure a stable operation of the battery pack.

10. The battery pack charging and discharging protection system according to claim 8, wherein the switch button detect circuit divides the voltage of the battery pack and transmits the divided voltage to the MCU self-locking circuit through the voltage regulator unit when the button between the first switch coupling wake-up circuit and the second switch coupling wake-up circuit is turned on, and the MCU self-locking circuit detects the duration time of the high level of the button to send a power-down instruction.

\* \* \* \* \*